(12) United States Patent
Fitzgerald

(10) Patent No.: US 6,466,548 B1
(45) Date of Patent: Oct. 15, 2002

(54) HOP BY HOP QUALITY OF SERVICE MEASUREMENT SYSTEM

(75) Inventor: Cary W. Fitzgerald, Pleasanton, CA (US)

(73) Assignee: Cisco Technology, Inc., San Jose, CA (US)

(*) Notice: Subject to any disclaimer, the term of this patent is extended or adjusted under 35 U.S.C. 154(b) by 0 days.

(21) Appl. No.: 09/181,952

(22) Filed: Oct. 28, 1998

(51) Int. Cl.[7] .............................................. H04L 12/66
(52) U.S. Cl. ...................... 370/249; 370/352; 370/401
(58) Field of Search ................................. 370/230, 221, 370/352, 389, 392, 400, 401, 241, 248, 249, 250

(56) References Cited

U.S. PATENT DOCUMENTS

| | | | |
|---|---|---|---|
| 4,506,358 A | | 3/1985 | Montgomery |
| 5,933,490 A | * | 8/1999 | White et al. ................ 379/221 |
| 6,011,790 A | * | 1/2000 | Fisher ......................... 370/349 |
| 6,154,448 A | * | 11/2000 | Petersen et al. ............. 370/248 |
| 6,259,677 B1 | * | 7/2001 | Jain ............................ 370/252 |
| 6,292,479 B1 | * | 9/2001 | Bartholomew et al. ..... 370/352 |

* cited by examiner

Primary Examiner—Alpus H. Hsu
Assistant Examiner—Roberta Stevens
(74) Attorney, Agent, or Firm—Marger Johnson & McCollom, PC

(57) ABSTRACT

Loopback interfaces are put into routers in a packet switched network. When an end to end Quality of Service (QoS) path is not performing adequately, the delay and jitter characteristics are measured for individual network subsystems. An audio signal is converted into a stream of audio packets and sent hop by hop to the different routers in the network having the loopback interface. QoS is determined by looping back the stream of audio packets from the different routers. If necessary, the network is reconfigured according to loopback delay in the individual network subsystems. Reconfiguration can comprise routing telephone calls through different paths in the network or adding additional equipment to increase capacity.

33 Claims, 5 Drawing Sheets

END TO END DELAY = d ms = $d_0 + d_1 + d_2 + d_3$

HOP BY HOP QUALITY OF SERVICE MEASUREMENT SYSTEM

BACKGROUND OF THE INVENTION

The present invention relates to a packet switched network used for transmitting audio data, video data or any other delay sensitive data, and more particularly to a hop by hop loopback system that locates quality of service problems in the packet switched network.

Conversations between two or more people include constant acknowledgements. If the conversation is face to face, the acknowledgement can be either visual or audible. Visual acknowledgements are typically in the form of body motions such as a head nod, hand motion, or facial expression. Audible acknowledgements typically come in the form of words or noises such as "I see", "ok", "yes", "um hum", etc. Phone conversations also require constant acknowledgements. Since phone conversations are not conducted face to face, these acknowledgements must be given audibly.

Packet switched networks, such as the Internet, are used for conducting telephone calls. Audio signals from a telephone are converted into voice packets by an originating gateway. The voice packets are then transmitted over the packet switched network to a destination gateway that converts the voice packets back into voice signals that are output to a destination telephone. Delay is a particular problem in packet switched networks that disrupts the interaction and feedback in telephone conversations.

For example, if the network has a lot of delay, audio feedback can be misinterpreted. A person completing a statement over the phone may wait for an acknowledgement such as "ok", "yes", "I see", "uh hum", etc. The packet switched network can delay the voice packets containing the acknowledgement. The delayed acknowledgement may be misinterpreted as confusion, apathy, or rudeness. While in fact, an immediate acknowledgement was given by the listener. If audio signals are delayed too long, the speaker may go onto another subject. When the audio packets do arrive, the-speaker does not know what part of the conversation the listener was responding to. These network delays result in disjointed and confusing conversations.

Utilities currently exist that can identify end to end network delay. End to end delay is generally defined as the time it takes a packet to go from an originating telephony gateway endpoint to a destination telephony gateway endpoint. One way to measure end to end delay is to put loopback interfaces into the gateway endpoints. A packet sent from the originating gateway is sent to the destination gateway and then automatically looped back to the originating gateway. The roundtrip delay from the originating gateway to the destination gateway and back to the originating gateway is then calculated.

A distributed packet switched network includes different subsystems or subnetworks connected together through different network processing nodes such as routers, switches, etc. Any one or more of these subnetworks or processing nodes could be the primary contributor to the end to end delay. End to end delay measurements do not identify where these delays occur in the packet switched network. The subsystems or processing nodes that cause the delay problems, therefore, cannot be located.

Existing loopback systems also do not test QoS for voice traffic sent over a packet switched network. During any given telephone conversation, the voice packets may be routed through different paths depending on network congestion and other similar considerations. Also, the voice path for incoming voice packets may be different than the voice path for outgoing voice packets. Existing loopback systems, e.g., ping, can only generate one packet about every second. Thus, these loopback systems do not simulate the traffic conditions that are created with an actual audio packet stream. Additionally, ping is based on ICMP, which may receive different treatment by routers than regular traffic.

Accordingly, a need remains for a system that can identify and locate causes of audio QoS problems in a distributed packet switched network.

SUMMARY OF THE INVENTION

Loopback interfaces are put into routers throughout a packet switched network. When an end to end path in the network is not providing satisfactory Quality of Service (QoS), the delay and jitter characteristics of an audio signal are measured for individual network subsystems between the end to end path. The audio signal is converted into a stream of audio packets and sent hop by hop to the different routers in the network with the loopback interfaces. The QoS for the subsystems are determined by measuring the audio packet stream looped-back from the different routers.

Subsystems with QoS problems can be identified by comparing the results of adjacent hop by hop loopbacks. If a loopback from a first router has minimal delay and the loopback from a next router has excessive delay, the QoS problem exists in the subsystem between the two routers. The capacity of the network can then be adjusted as necessary according to the measured transmission delay. For example, telephone calls may be rerouted around the problem subsystem through a different network path or additional equipment may be added to the problem subsystem to increase capacity.

Existing network utilities such as trace route can be used to automatically calculate routes in the packet switched network between a source gateway and a destination gateway. Loopback calls are then automatically sent to routers with loopback interfaces. The loopback delays are then calculated for each of the loopback calls to determine the QoS for the different network subsystems.

Hop by hop loopback is especially useful to Internet Service Providers (ISPs) that buy network services for different backbone carriers. The QoS can be separately measured for both the ISP network and the backbone carrier networks to determine whether the backbone carrier is meeting agreed upon QoS.

The foregoing and other objects, features and advantages of the invention will become more readily apparent from the following detailed description of a preferred embodiment of the invention which proceeds with reference to the accompanying drawings.

DETAILED DESCRIPTION

Figure 1:
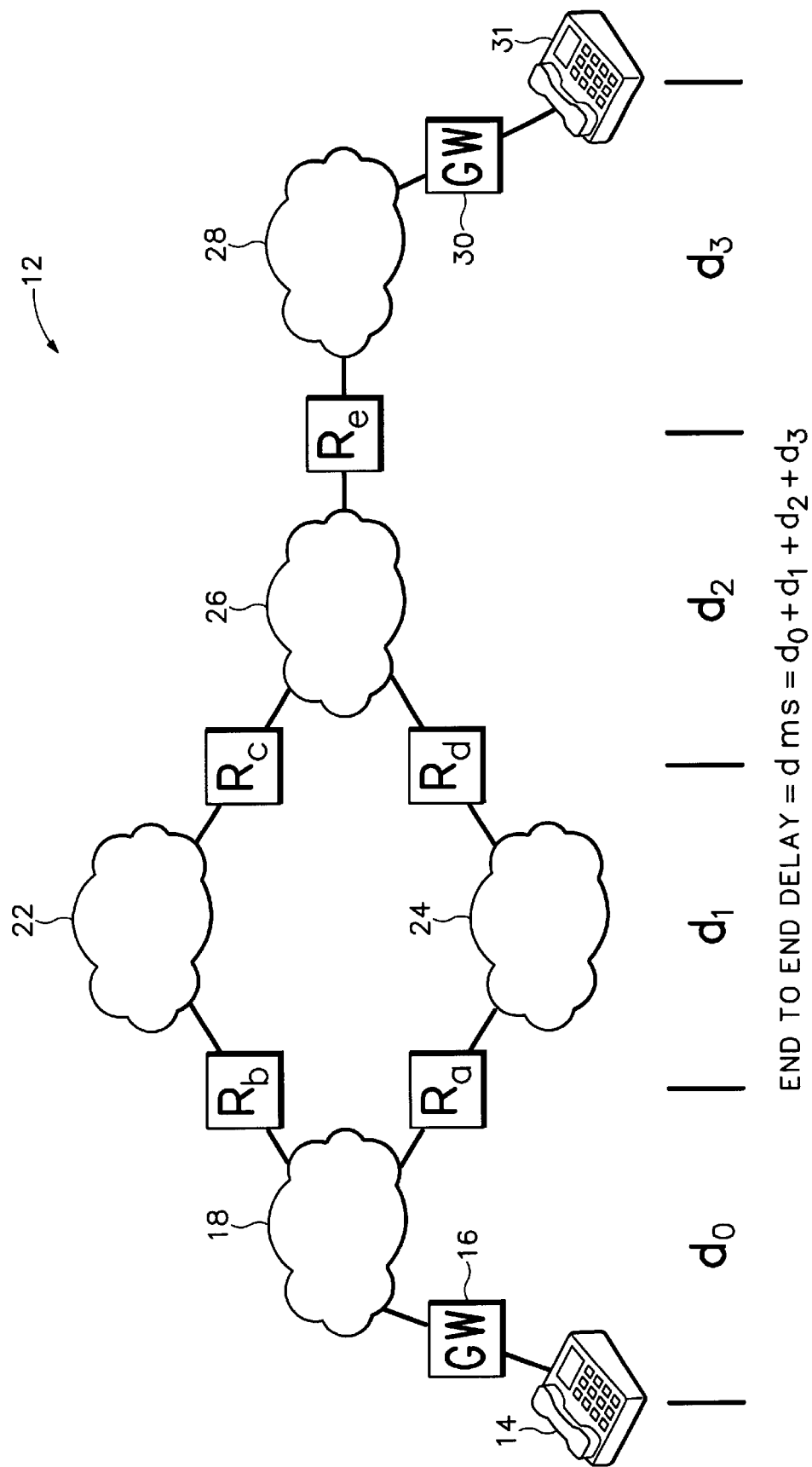
FIG. 1 is a schematic diagram of a packet switched network using the hop by hop loopback system according to the invention.

Referring to FIG. 1, a distributed packet switched network 12 having a hop by hop loopback system includes multiple subnetworks 18, 22, 24, 26 and 28 connected together through different network processing nodes Ra, Rb, Rc, Rd and Re. The subnetworks comprise different Local Area Networks (LANs), Wide Area Networks (WANs) and/or Public Switched Telephone Networks (PSTNs). The processing nodes comprise devices such as routers, switches, communication links etc. These different processing nodes are referred to generally below as routers. A telephone 14 is connected to the network 12 through a Voice over IP (VoIP) gateway 16. A telephone 31 is connected to the network 12 through a VoIP gateway 30.

The VoIP gateways 16 and 30 are capable of converting back and forth between analog voice signals and audio packets. The gateways 16 and 30 also have end to end loopback capability. Some VoIP gateways with loopback capability include the Model Nos. 2600, 3600 and 5300 manufactured by Cisco Systems, Inc., 170 West Tasman Drive, San Jose, Calif. 95134-1706.

An end to end telephone call between the gateways 16 and 30 may have unacceptable end to end delay "d". A system administrator does not know where the primary cause of the delay is occurring in network 12. A delay do may exist between telephone 14 and router Ra, a delay $d_1$ may exist between the router Ra and a router Rd, a delay $d_2$ may exist between router Rd and router Re and a delay $d_3$ may exist between router Re and telephone 31. These delays from the subnetworks and processing nodes between the two endpoints 18 and 30 are additive generating the overall end to end delay $d=d_0+d_1+d_2+d_3$. One of more of these delays may be the primary contributor to the overall delay d. These delays can be caused by a variety of different reasons such as router congestion or a slow network link along the communication path.

To perform effective voice QoS testing, the invention places the same loopback interface used in VoIP gateways into non-voice routers, such as routers Ra, Rb, Rc and Rd. The loopback interfaces allow hop by hop loopback testing described below. Any type of network router can be installed with the loopback interface. For example, the Model Nos. 7200, 7500, and 4000 all manufactured by Cisco Systems, Inc. are standard routers used in packet switched networks that can be installed with loopback interfaces.

The loopback interfaces are implemented in software in the routers. The loopback interfaces receive the audio packets and then send the audio packet stream back out uninterpreted to the originating gateway. This provides reliable audio QoS measurements for any individual subsystem inside the network 12. Separate loopback software interfaces can be used for each supported QoS application. For example, a separate loopback interface can be provided for RTP (protocol carrying voice for H.323, SIP and SGCP), FRF.11 VoFR and SNA.

Figure 2:
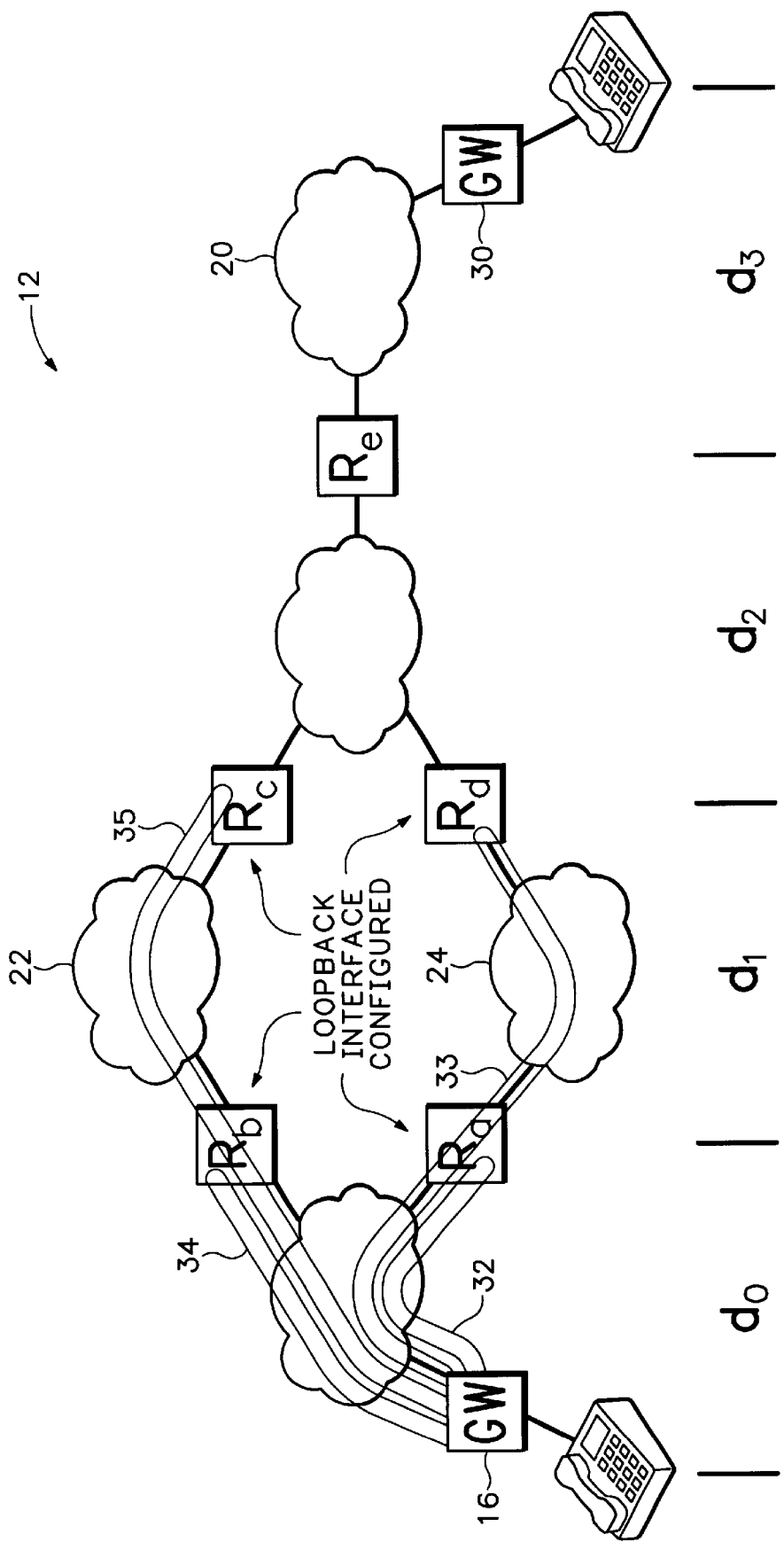
FIG. 2 is a schematic diagram of the network in FIG. 1 showing audio loopbacks performed from different processing nodes in the network.

Referring to FIG. 2, the network administrator determines if there is a QoS problem by performing an end to end loopback call from gateway 16 to gateway 30. The description below assumes that gateway 16 originates the hop by hop loopbacks. However, the loopbacks can be originated from any gateway in the network.

Voice packets are sent out from gateway 16 and then looped back by gateway 30 to gateway 16. The gateway 16 measures the delay required for the voice packets to loop through the entire network 12. If the QoS for the end to end loop back is poor (large delay), the hop by hop loopback system is used to isolate the primary source of the delay.

The network administrator has a topology of the network 12 that identifies the addresses for the routers, such as Ra, Rb, Rc, Rd and Re, that each have a loopback interface according to the invention. To isolate the sublink creating the delay, the system administrator initiates a first loopback call 32 to router Ra. The first loopback call 32 may indicate either a large delay or a small acceptable delay between originating gateway 16 and router Ra. If the delay is small, the problem exists either between router Ra and gateway 30 or along an alternate communication path formed by routers Rb and Rc.

The system administrator continues hop by hop loopback calls through the network 12 until the primary location of the delay is isolated. For example, a second loopback call 33 is initiated from gateway 16 to router Rd. If substantial delay is detected in the second loopback call 33, the QoS problem exists between router Ra and router Rd. If the QoS problem does not appear in the loopback calls 32 and 33, a loopback 34 may be tried in an alternate network path. If the QoS is good for loopback 34, then the next hop by hop loopback call is made to Rc and a next loopback call possibly made to router Re. The hop by hop loopbacks can be initiated in any sequence depending on the network configuration. The sequence described above is merely one example.

Internet utilities such as Ping diagnose Internet Protocol (IP) connections. Ping can send a signal to any Internet-connected computer. Ping generates data on the number of packets transmitted and received. The problem with Ping is that only about one data packet is sent every second. QoS audio problems are often caused by network congestion. Because PING does not generate packets at audio communication rates of one audio packet every 20 milliseconds, audio QoS problems may not be detected.

Test loads generated during hop by hop loopback simulate a voice stream generated during a typical telephone call. The hop by hop loopback system can therefore, measure the actual jitter or absolute delay that an audio packet stream actually experiences in the network 12.

Figure 3:
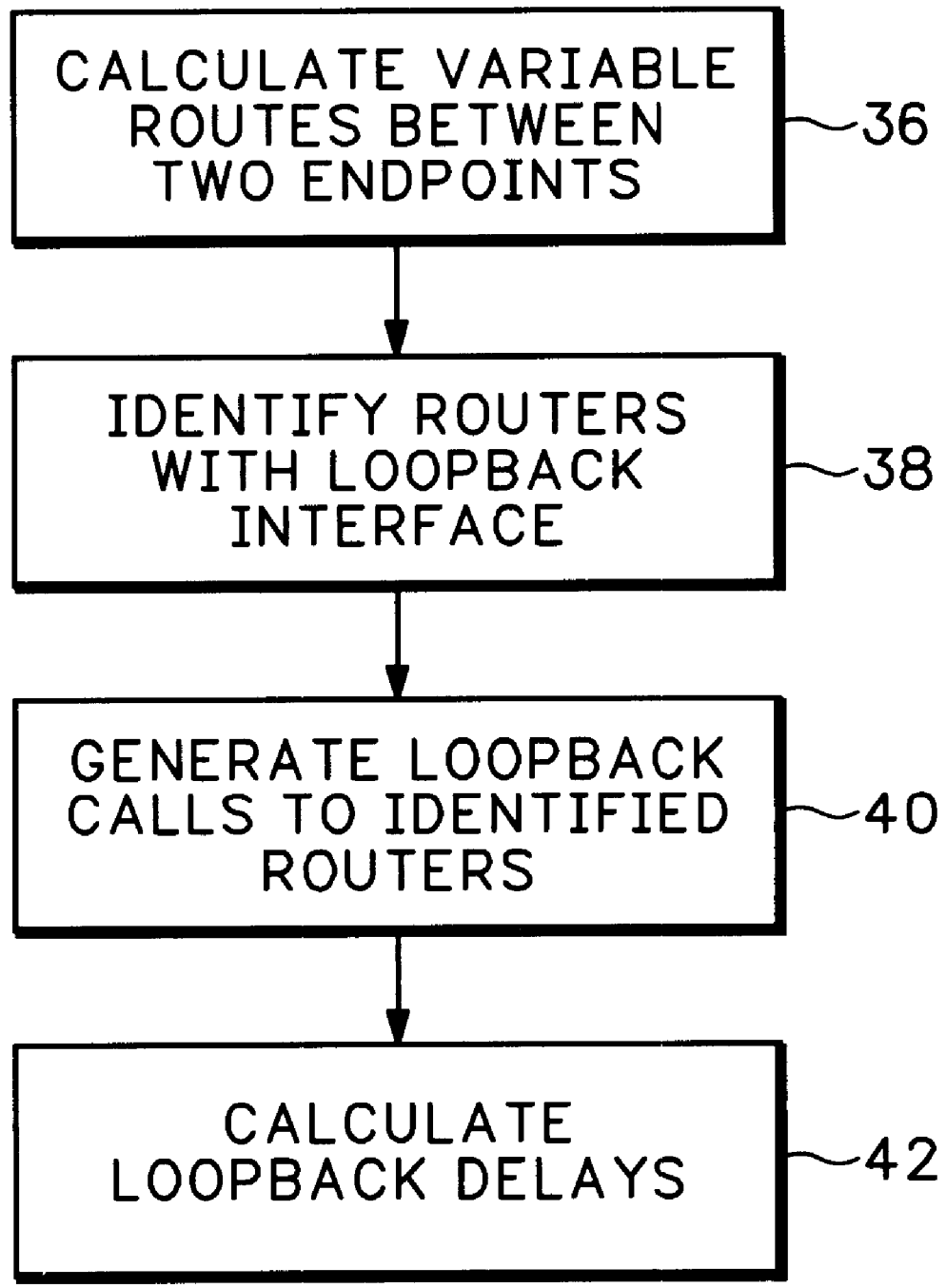
FIG. 3 is a block diagram showing how the hop by hop loopback system operates.

Referring to FIG. 3, existing Internet utilities such as Pathcar can calculate the different routes through network 12. Block 36 uses utilities like Pathcar to calculate a route table for the network 12. The route table is used in block 38 to identify the topology of the network 12 and to identify the routers that have the loopback feature of the invention. Loopback calls are initiated to the identified routers in block 40. The loopback delays are then calculated in block 42. From the calculated delays, a network administrator is then able to determine the source of the QoS problem.

The loopback calls can also be automatically initiated and measured by software in the gateway 16. Loopback calls are made incrementally starting from either the closest or furthest loopback interface from the originating gateway 16. The loopback calls are then made automatically hop by hop through the network 12, if necessary, to every router with a loopback interface. The loopback delays are then presented in a list to the system administrator. The loopback calls can also be initiated automatically through the network until a certain delay threshold is exceeded. Then only the loopback path exceeding the delay threshold is identified to the network administrator.

Once the location and source of the QoS problem are identified, steps are taken by the system administrator to correct the QoS problem. If the problem is congestion at a router location, priority bits can be set in the audio packets to increase priority. Different router queuing techniques can also be selected to more efficiently process the audio packets. In addition, faster interfaces, additional routing resources, or upgraded routing resources can be installed at the source of the congestion.

Figure 4:
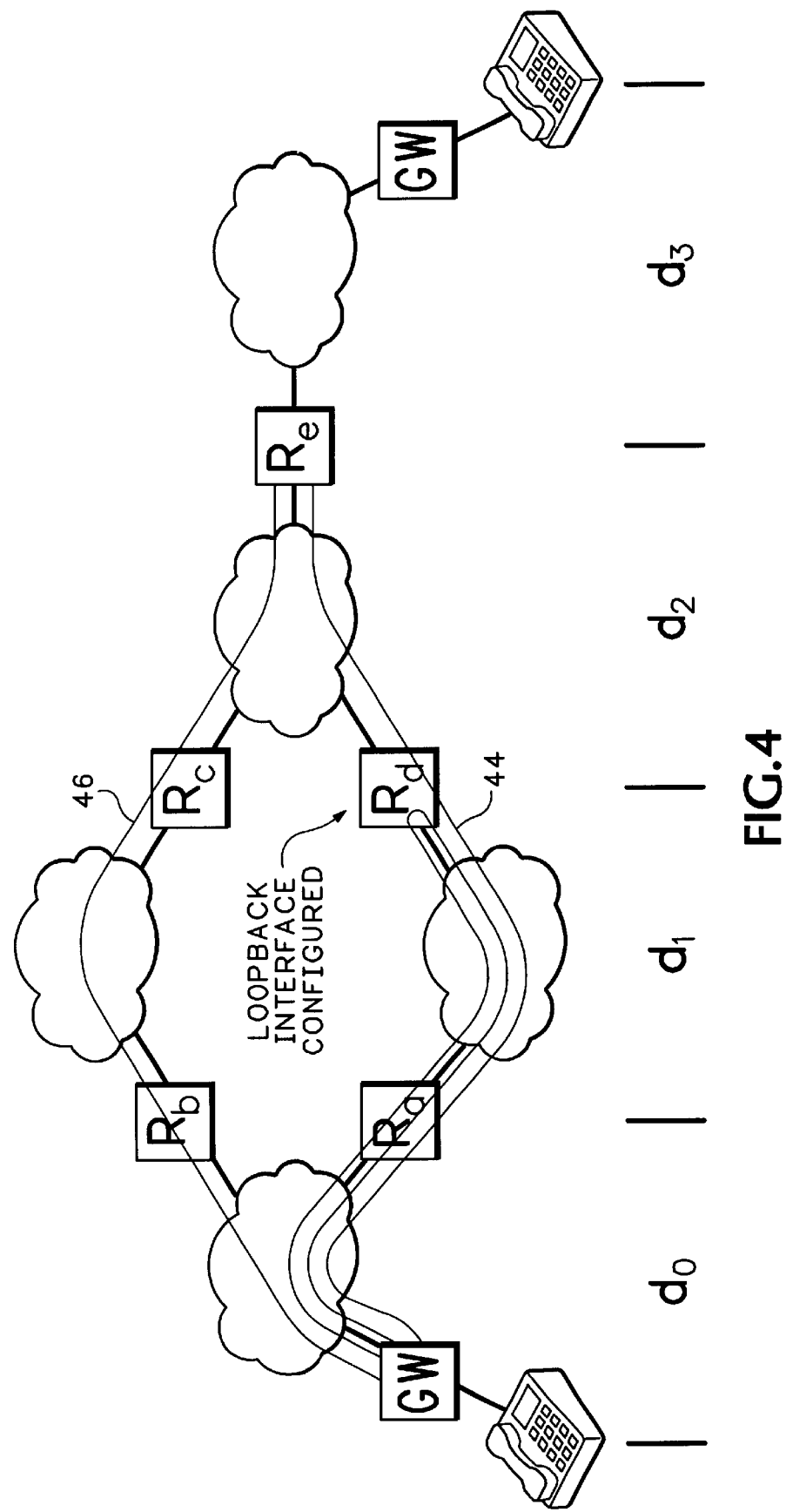
FIG. 4 is a schematic diagram of the network in FIG. 1 reconfigured according to measurements taken by the hop by hop loopback system in FIG. 2.

Referring to FIG. 4, the hop by hop loopback system can also be used for capacity planning. Two routes are shown from the originating gateway 16 to the destination gateway 30. A first path 40 goes through routers Ra and Rd. The second route 42 goes through routers Rb and Rc. The hop by hop loopback system provides a way to quantitatively determine the delay for these individual paths 44 and 46. A system administrator can perform capacity planning around the two paths. For example, the hop by hop loopback delay for path 44 may be substantially less than path 46. The network can then be configured to route telephone calls through path 44.

Figure 5:
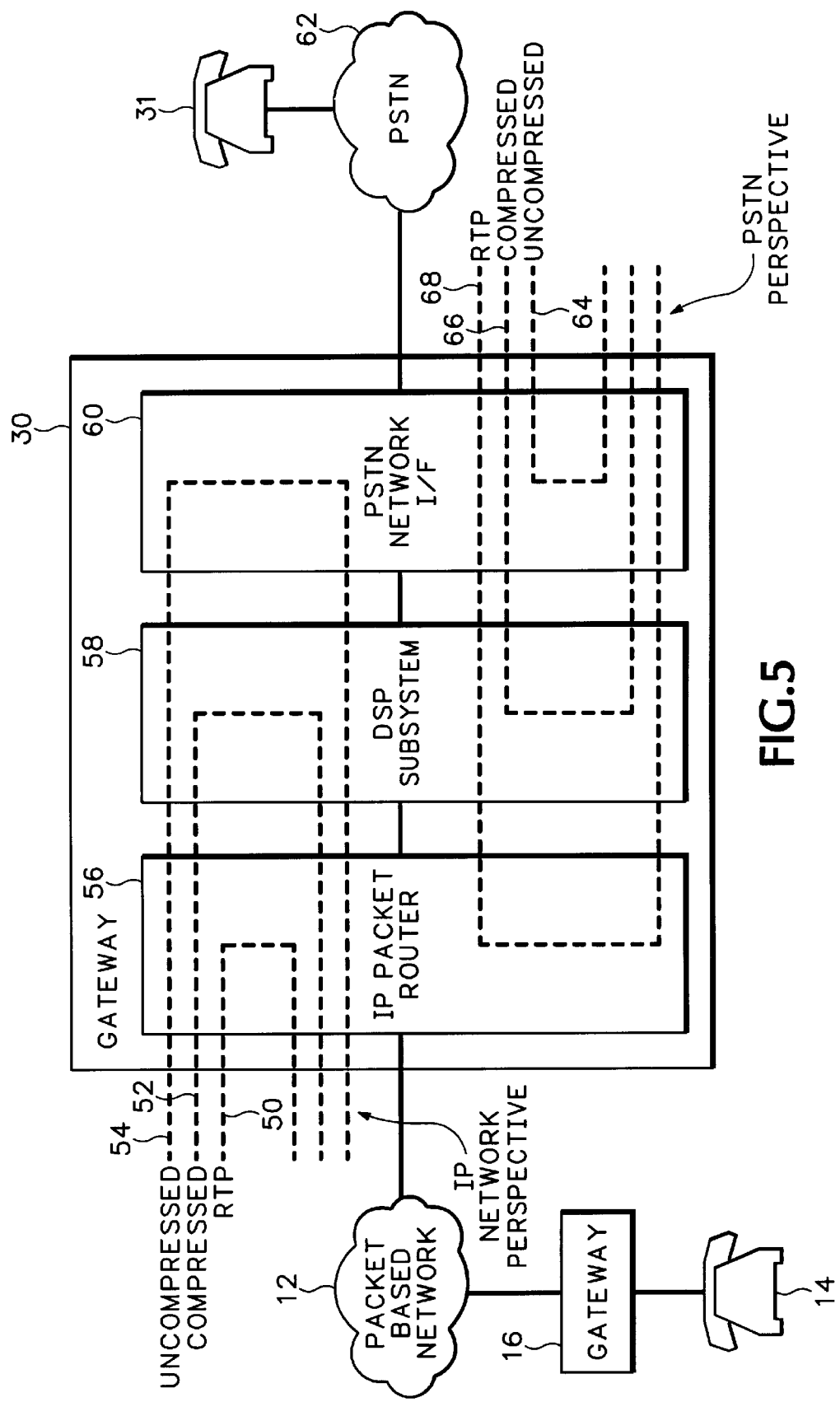
FIG. 5 is a detailed block diagram showing how multi-level hop by hop loopback is used in a Voice over IP gateway.

Referring to FIG. 5, VoIP gateways include a Public Switched Telephone Network (PSTN) interface 60 that receives Pulse Code Modulated (PCM) audio signals from a PSTN network 62. A Digital Signal Processor (DSP) subsystem 58 encodes the audio signals from the PSTN interface 60 and decodes audio packets from an IP packet router 56. The IP packet router 56 establishes connections for routing the audio packets to the endpoint 16 in the network 12. The multilevel loopbacks are described below in terms of gateway 30. However, the multilevel loopbacks can be performed in any VoIP gateway in network 12.

A dialplan mapper (not shown) supports multilevel loopback in the gateway 30 so that users or troubleshooters can invoke loopback from any VoIP capable endpoint. The dialplan mapper is described in detail in copending application entitled: SIGNALING STATE MANAGEMENT SYSTEM FOR PACKET NETWORK GATEWAYS; Ser. No. 09/107,071; filed on Jun. 29, 1998 which is herein incorporated by reference.

The dialplan mapper to various loopback levels maps a dialstring. The syntax is: loopback:where. "Where" is one of three loopback levels, RTP, Compressed, and Uncompressed in the gateway 30. To understand how this works, assume the following configuration in the dial plan mapper of VoIP gateway 30 called "testme":

+1408526\*311→loopback:RTP
+1408526\*312→loopback:Compressed
+1408526\*313→loopback:Uncompressed The dial plan maps for other routers or gateways have the extra entry:

7*→dns:testme.cisco.com session=cisco controlled_load best_effort

With this setup, different levels of the gateway 30 can be tested from any telephone in network 12.

For local loopback it is assumed that the calling line has been assigned a number like+1408526xxxx. Phone 31 is picked up and one of the numbers *311, *312, or *313 is dialed. If the phone 31 is on the other side of a PBX or a PSTN 62, enough digits have to be dialed to get the call completed to the VoIP gateway 30. The dotted lines 50, 52, 54, 64, 66 and 68 show the different loopback paths initiated by the different telephone numbers.

Uncompressed 64: A Pulse Code Modulated (PCM) voice signal coming into the DSP 58 from the PSTN interface 60 is turned around and sent back out PSTN 62 allowing testing of the transmit→receive paths in the telephony end point 31.

Compressed 66: A compressed voice signal coming out of a codec in the DSP subsystem 58 is fed back into a decompressor through a jitter buffer. In addition to testing the telephony endpoint, the encode and decode paths in the DSP 58 are tested without involving data paths or packet handling of the IP packet router 56.

RTP 68: A session application in the IP packet router 56 sets up an RTP stream to itself. RTP is a "Real-Time Transport Protocol" used for transporting voice information and is described in RTP—Internet Request for Comments 1889. The router 56 allocates a port pair and opens the appropriate User Datagram Protocol (UDP) sockets. The router 56 performs fill RTP encapsulation, sends the packets to the loopback IP address, receives the RTP packets, and hands the compressed voice back to the CODEC in DSP subsystem 58. This tests the entire local processing path, both transmit and receive, in the router 56, as well as all the other paths described above.

A remote loopback is an end to end loopback initiated from telephone 14 to the gateway 30 all the way across the packet switched network 12. To initiate a remote loopback, the phone 14 is picked up and the number 7*311, or 7*312 or 7*313 is dialed. Again, if the telephone 14 is connected to the gateway 16 through a PBX or PSTN, enough digits have to be dialed to get the call completed to the VoIP gateway 16. The dial plan in gateway 16 initiates an IP session to testme.cisco.com, and passes the lower part of the number, say *311, to the gateway 30. When the session application on gateway 30 extracts the number with *31x in it, loopback is invoked as follows:

RTP 54: RTP packets from the network 12 are decapsulated and immediately reencapsulated in the outbound RTP stream, using the same media clock (i.e., time stamp) as the received packet. The RTP packets are then sent back to the source gateway 16 as if the voice signals had originated on a telephony port on testme gateway 30.

Compressed 52: RTP packets received from the network 12 are decapsulated and passed to the DSP subsystem 58.

Instead of feeding the audio packets into the CODEC for decompression, they are immediately sent back to the IP session application in router 56 as if they had originated locally and been compressed. The voice packets may or may not be dejittered before being sent back to router 56.

Uncompressed 54: In addition to the above, the voice samples are sent all the way through the CODEC in DSP 58 and then turned around instead of being sent to the telephony endpoint 31.

QoS problems may occur in the RTP path, the DSPs that compress and decompress the audio signals, or the PSTN path after the audio packets have been uncompressed into the speech as it actually is suppose to sound coming out of the gateway 30. Multilevel hop by hop loopback separately tests each one of these paths so QoS problems can be further located inside each VoIP gateway.

Having described and illustrated the principles of the invention in a preferred embodiment thereof, it should be apparent that the invention can be modified in arrangement and detail without departing from such principles. I claim all modifications and variation coming within the spirit and scope of the following claims.

What is claimed is:

1. A hop by hop loopback system, comprising:
   a Voice Over IP gateway connected to the packet switched network for converting audio signals into a stream of audio packets representing a voice stream generated during a telephone call and routing the audio packets through network processing nodes to a destination endpoint in a packet switched network; and
   the Voice Over IP gateway using multiple loopback interfaces located in the network processing nodes to selectively loopback the audio packets from different individually selectable loopback interfaces at the network processing nodes to the gateway.

2. A system according to claim 1 wherein the Voice over IP gateway measures delays in receiving the stream of audio packets back from the different network processing nodes in the packet switched network and selects different conununication paths for sending additional audio packets by comparing the different delays.

3. A system according to claim 1 including a route table identifying the network processing nodes in different communication paths in the packet switched network containing loopback interfaces, the Voice Over IP gateway identifying different selectable combinations of the network processing nodes in the different communication paths for sending the audio packets.

4. A system according to claim 1 wherein the Voice Over IP gateway includes audio packet loopback interfaces between each of the following:
   a telephone interface that receives the audio signals from a telephone;
   a digital signal processor subsystem that encodes the audio signal into audio packets and decodes the audio packets into audio signals; and
   an IP packet router that establishes connections for routing the audio packets to the destination endpoint.

5. A system according to claim 1 wherein the destination endpoint comprises a destination gateway having audio packet loopback interfaces between each of the following:
   a telephony interface that receives the audio signals from a destination telephone;
   a digital signal processor subsystem that encodes the audio signals into audio packets and decodes the audio packets into audio signals; and
   an IP packet router that establishes connections for routing the audio packets to the originating endpoint.

6. A system according to claim 1 wherein the gateway automatically identifies only the network processing nodes in the packet switched network having loopback interfaces and automatically initiates audio loopbacks only to the identified network processing nodes.

7. A method for detecting quality of service in a packet switched network having network processing nodes connecting together subnetworks, comprising;
   converting audio signals into a stream of audio packets;
   sending the stream of audio packets hop by hop to individually selectable different network processing nodes throughout the packet switched network in a selectable order to create different selectable voice traffic conditions;
   selectively looping back the stream of audio packets from the network processing nodes; and
   measuring transmission delays for the loopbacked streams of audio packets from the different network processing nodes to determine the quality of audio service of the individual processing nodes and subnetworks in the packet switched network.

8. A method according to claim 7 including adjusting capacity of the packet switched network according to the measured transmission delays.

9. A method according to claim 8 including adjusting the capacity of the network by reconfiguring the network to reroute telephone calls through loopback paths having smaller transmission delays.

10. A method according to claim 7 including:
    generating the audio signals from a local telephone;
    receiving the audio signals with a telephone network interface in a local voice over IP gateway;
    encoding the audio signals with a digital signal processor in the local gateway into audio packets; and
    establishing a connection in the packet switched network through the local gateway for sending the audio packets to a remote telephone.

11. A method according to claim 7 including:
    installing a dial map into a local gateway that stores telephone numbers associated with a circuit switched telephone network interface, a digital signal processor and a packetswitched network interface; and
    initiating a loop back of the audio signals from any selectable one of the circuit switched telephone network interface, digital signal processor and the packet-switched network interface by entering numbers stored by the dial map associated with the circuit switched telephone network interface, digital signal processor and the packet-switched network interface.

12. A method according to claim 7 including:
    accessing a routing table that identifies different paths in the packet switched network that include loopback interfaces; and
    looping back the stream of audio packets hop by hop and one network processing node at a time along different selected paths identified in the routing table.

13. A method according to claim 7 including the following:

automatically calculating routes in the packet switched network between a source gateway and a destination gateway of the audio packets;

automatically identifying routers in the packet switched network with loopback interfaces;

automatically generating loopback calls to the identified routers; and calculating loopback delays for each of the loopback calls to determine the quality of service of the different sublinks between the routers with loopback interfaces.

14. A method according to claim 13 including generating the loopback calls until one of the loopback calls exceeds a predetermined delay threshold level and identifying a loopback path where the predetermined delay threshold level was exceeded.

15. A hop by hop loopback system for a packet switched network having network processing nodes connecting together network subsystems; comprising:

a Voice Over IP gateway connected to the packet switched network for converting audio signals into a stream of audio packets representing a voice stream during a phone call and sending the audio packets through the network processing nodes to a destination endpoint in the packet switched network; and a routing table that identifies multiple loopback interfaces located in the network processing nodes that can loopback the audio packets, the Voice Over IP gateway selectively directing the audio packets to individual network processing nodes identified in the routing table for testing individual selectable network subsystems in the packet switched network.

16. A system according to claim 15 including a dialplan mapper that contains different phone number dialstrings associated with the different loopback locations in the packet switched network.

17. A system according to claim 16 wherein the dialplan mapper includes a set of test number entries associated with multiple different loopback paths at the loopback locations identified by the phone number entries.

18. An electronic storage medium containing software for detecting quality of service in a packet switched network having network processing nodes connecting together subnetworks, comprising;

code for converting audio signals into a stream of audio packets;

code for sending the stream of audio packets hop by hop to individually selectable different network processing nodes throughout the packet switched network in a selectable order to create different selectable voice traffic conditions;

code for selectively looping back the stream of audio packets from the network processing nodes; and code for measuring transmission delays for the loopbacked streams of audio packets from the different network processing nodes to determine the quality of audio service of the individual processing nodes and subnetworks in the packet switched network.

19. An electronic storage medium according to claim 18 including code for adjusting capacity of the packet switched network according to the measured transmission delays.

20. An electronic storage medium according to claim 19 including code for adjusting the capacity of the network by reconfiguring the network to reroute telephone calls through loopback paths having smaller transmission delays.

21. An electronic storage medium according to claim 18 including:

code for generating the audio signals from a local telephone;

code for receiving the audio signals with a telephone network interface in a local voice over IP gateway;

code for encoding the audio signals with a digital signal processor in the local gateway into audio packets; and code for establishing a connection in the packet switched network through the local gateway for sending the audio packets to a remote telephone.

22. An electronic storage medium according to claim 18 including:

code for installing a dial map into a local gateway that stores telephone numbers associated with a circuit switched telephone network interface, a digital signal processor and a packet-switched network interface; and code for initiating a loopback of the audio signals from any selectable one of the circuit switched telephone network interface, digital signal processor and the packet-switched network interface by entering numbers stored by the dial map associated with the circuit switched telephone network interface, digital signal processor and the packet-switched network interface.

23. An electronic storage medium according to claim 18 including:

code for accessing a routing table that identifies different paths in the packet switched network that include loopback interfaces; and code for looping back the stream of audio packets hop by hop and one network processing node at a time along different selected paths identified in the routing table.

24. An electronic storage medium according to claim 18 including the following:

code for automatically calculating routes in the packet switched network between a source gateway and a destination gateway of the audio packets;

code for automatically identifying routers in the packet switched network with loopback interfaces;

code for automatically generating loopback calls to the identified routers; and code for calculating loopback delays for each of the loopback calls to determine the quality of service of the different sublinks between the routers with loopback interfaces.

25. An electronic storage medium according to claim 24 including code for generating the loopback calls until one of the loopback calls exceeds a predetermined delay threshold level and code for identifying a loopback path where the predetermined delay threshold level was exceeded.

26. A system for detecting quality of service in a packet switched network having network processing nodes connecting together subnetworks, comprising;

means for converting audio signals into a stream of audio packets;

means for sending the stream of audio packets hop by hop to individually selectable different network processing nodes throughout the packet switched network in a selectable order to create different selectable voice traffic conditions;

means for selectively looping back the stream of audio packets from the network processing nodes; and means for measuring transmission delays for the loopbacked streams of audio packets from the different network processing nodes to determine the quality of audio service of the individual processing nodes and subnetworks in the packet switched network.

27. A system according to claim 26 including means for adjusting capacity of the packet switched network according to the measured transmission delays.

28. A system according to claim 27 including means for adjusting the capacity of the network by reconfiguring the network to reroute telephone calls through loopback paths having smaller transmission delays.

29. A system according to claim 26 including:

means for generating the audio signals from a local telephone;

means for receiving the audio signals with a telephone network interface in a local voice over IP gateway;

means for encoding the audio signals with a digital signal processor in the local gateway into audio packets; and means for establishing a connection in the packet switched network through the local gateway for sending the audio packets to a remote telephone.

30. A system according to claim 26 including:

means for installing a dial map into a local gateway that stores telephone numbers associated with a circuit switched telephone network interface, a digital signal processor and a packet-switched network interface; and means for initiating a loopback of the audio signals from any selectable one of the circuit switched telephone network interface, digital signal processor and the packet-switched network interface by entering numbers stored by the dial map associated with the circuit switched telephone network interface, digital signal processor and the packet-switched network interface.

31. A system according to claim 26 including:

means for accessing a routing table that identifies different paths in the packet switched network that include loopback interfaces; and means for looping back the stream of audio packets hop by hop and one network processing node at a time along different selected paths identified in the routing table.

32. A system according to claim 26 including the following:

means for automatically calculating routes in the packet switched network between a source gateway and a destination gateway of the audio packets;

means for automatically identifying routers in the packet switched network with loopback interfaces;

means for automatically generating loopback calls to the identified routers; and means for calculating loopback delays for each of the loopback calls to determine the quality of service of the different sublinks between the routers with loopback interfaces.

33. A system according to claim 32 including means for generating the loopback calls until one of the loopback calls exceeds a predetermined delay threshold level and means for identifying a loopback path where the predetermined delay threshold level was exceeded.

* * * * *